United States Patent
Gupta et al.

(10) Patent No.: US 11,115,968 B2
(45) Date of Patent: Sep. 7, 2021

(54) SYSTEM AND METHOD FOR EFFICIENT FREQUENCY RESOURCE ASSIGNMENT IN A COMMUNICATION SYSTEM

(71) Applicant: QUALCOMM INCORPORATED, San Diego, CA (US)

(72) Inventors: Piyush Gupta, Bridgewater, NJ (US); Junyi Li, Chester, NJ (US); Vinay Joseph, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 16/534,371

(22) Filed: Aug. 7, 2019

(65) Prior Publication Data
US 2020/0059906 A1   Feb. 20, 2020

Related U.S. Application Data

(60) Provisional application No. 62/764,880, filed on Aug. 16, 2018.

(51) Int. Cl.
| | |
|---|---|
| H04W 72/04 | (2009.01) |
| H04W 76/27 | (2018.01) |
| H04L 5/00 | (2006.01) |
| H04W 28/06 | (2009.01) |

(52) U.S. Cl.
CPC ......... H04W 72/042 (2013.01); H04L 5/0053 (2013.01); H04L 5/0094 (2013.01); H04W 28/06 (2013.01); H04W 76/27 (2018.02); *H04L 5/0005* (2013.01)

(58) Field of Classification Search
CPC ... H04W 72/042; H04W 76/27; H04W 28/06; H04L 5/0053; H04L 5/0094; H04L 5/0005
See application file for complete search history.

(56) References Cited

U.S. PATENT DOCUMENTS

| | | | | |
|---|---|---|---|---|
| 2010/0195614 A1* | 8/2010 | Nimbalker | ............ | H04L 1/0025 370/330 |
| 2013/0003663 A1* | 1/2013 | Blankenship | ......... | H04L 5/0053 370/329 |
| 2014/0036889 A1* | 2/2014 | Kim | .................. | H04W 72/0446 370/336 |
| 2016/0037424 A1* | 2/2016 | Xie | ........................ | H04W 48/16 370/329 |
| 2016/0037524 A1* | 2/2016 | Krzymien | ............. | H04L 1/1896 370/329 |
| 2019/0372719 A1* | 12/2019 | Talarico | .............. | H04W 72/042 |

OTHER PUBLICATIONS

International Search Report and Written Opinion—PCT/US2019/045598—ISA/EPO—dated Mar. 17, 2020.
International Search Report and Written Opinion—PCT/US2019/045598—ISA/EPO—dated Nov. 6, 2019.

* cited by examiner

*Primary Examiner* — Duc C Ho
(74) *Attorney, Agent, or Firm* — Smith Tempel Blaha LLC

(57) ABSTRACT

A method for communication includes receiving a transport block size (TBS) configuration containing at least a portion of a frequency-domain resource allocation, and receiving a downlink control information (DCI) message having an additional portion of the frequency-domain resource allocation, the TBS configuration and the additional portion of the frequency-domain resource allocation having frequency-domain resource allocation information to support data communication.

30 Claims, 14 Drawing Sheets

1000

DCI Format 1_0

1010

| Field (Item) | Bits | Reference |
|---|---|---|
| Identifier for DCI formats | 1 | Always set to 1, meaning this is for DL |
| Frequency domain resource assignment | Var. | ceil(log2(n_RB (n_RB+1)/2)) ceil(log2(n_RB)) |
| Time domain resource assignment | X | Creates the row index of the items in PDSCH_allocationList in RRC |
| 1020 VRB-to-PRB mapping | 1 | 0: Non-Interleaved 1: Interleaved |
| Modulation and Coding Scheme 1030 | 5 | MCS index for PDSCH |
| New data indicator | 1 | |
| Redundancy version | 2 | |
| HARQ process number | 4 | |
| Downlink compression index | 2 | |
| TCP command for scheduled PUCCH | 2 | |
| PUCCH resource indicator | 3 | |
| PDSCH-to-HARQ feedback timing indicator | 3 | |

FIG. 10

SYSTEM AND METHOD FOR EFFICIENT FREQUENCY RESOURCE ASSIGNMENT IN A COMMUNICATION SYSTEM

RELATED APPLICATIONS

This application claims priority to and the benefit of U.S. Provisional Patent Application No. 62/764,880, entitled "SYSTEM AND METHOD FOR EFFICIENT FREQUENCY RESOURCE ASSIGNMENT IN A COMMUNICATION SYSTEM," filed Aug. 16, 2018, the contents of which are hereby incorporated herein by reference in its entirety as if fully set forth below and for all applicable purposes.

TECHNICAL FIELD

The technology discussed below relates to wireless communication systems, and more particularly to wireless communication devices used in factory automation. Embodiments enable efficient communication of frequency resource assignment.

INTRODUCTION

Industrial automation, also referred to as factory automation, involves the use of control systems for operating industrial equipment, such as assembly lines, robots, machines, and chemical processing systems. An industrial automation system may include computer-based controllers (also referred to as a programmable logic controller (PLC)), electronic sensors of various types, and electronically controlled actuators of various types, such as motors and other devices. Such sensor and actuator devices may be collectively referred to as "S/A" devices. An industrial automation system may include human machine interface (HMI) devices, such as portable computing devices, tablets, panels, wearable devices, etc., in communication with the controllers, and in communication with other HMI devices. A factory automation management system may oversee and communicate with one or more of the HMI devices and the controller devices.

In an industrial automation system, such devices may be configured to communicate with one another via one or more wired communication channels, and via one or more wireless local-area communication channels, such as, for example, a Bluetooth or Wi-Fi (IEEE 802.11) network.

Of the various communication paths in an industrial automation system, one of particular relevance is the communication channel between a controller (for example, a programmable logic controller (PLC)) and a sensor or actuator (S/A). Typically, this communication has a round trip transfer (RTT) objective of 0.5 to 10 milliseconds (ms), and a stringent bit error ratio (BER), on the order of 10e-6. A typical communication packet size may be on the order of 40-256 bytes, and the communication range may be on the order of 10-15 meters (m), typically not exceeding 100 m.

In general, the communication traffic is periodic with substantially fixed-size packets for a given controller and S/A network. A controller may communicate with tens or many tens of S/A devices. To achieve the stringent 10e-6 BER goal, both data transmission and control signalling should be communicated efficiently to conserve bandwidth and maintain very high reliability.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication including receiving a transport block size (TBS) configuration containing at least a portion of a frequency-domain resource allocation, and receiving a downlink control information (DCI) message having an additional portion of the frequency-domain resource allocation, the TBS configuration and the additional portion of the frequency-domain resource allocation having frequency-domain resource allocation information to support data communication.

Another aspect of the disclosure provides a system for communication including a communication device configured to receiving a transport block size (TBS) configuration containing at least a portion of a frequency-domain resource allocation, and the communication device configured to receiving a downlink control information (DCI) message having an additional portion of the frequency-domain resource allocation, the TBS configuration and the additional portion of the frequency-domain resource allocation having frequency-domain resource allocation information to support data communication.

Another aspect of the disclosure provides a method for communication, including receiving a transport block size (TBS) configuration containing at least a portion of a frequency-domain resource allocation, receiving a downlink control information (DCI) message having an additional portion of the frequency-domain resource allocation, the TBS configuration and the additional portion of the frequency-domain resource allocation having frequency-domain resource allocation information to support data communication wherein a frequency-domain resource assignment field in the DCI message comprises bits identifying a beginning resource block (RB) location in a communication stream, and after identifying the beginning resource block location, inferring a total number of resource blocks to support data communication.

Another aspect of the disclosure provides a non-transitory computer-readable medium storing computer executable code for communication, the code executable by a processor to receive a transport block size (TBS) configuration containing at least a portion of a frequency-domain resource allocation, and receive a downlink control information (DCI) message having an additional portion of the frequency-domain resource allocation, the TBS configuration and the additional portion of the frequency-domain resource allocation having frequency-domain resource allocation information to support data communication.

Yet another aspect of the disclosure provides a device for communication including means for receiving a transport block size (TBS) configuration containing at least a portion of a frequency-domain resource allocation, and means for receiving a downlink control information (DCI) message having an additional portion of the frequency-domain resource allocation, the TBS configuration and the additional portion of the frequency-domain resource allocation having frequency-domain resource allocation information to support data communication.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 10 is a drawing showing an exemplary embodiment of a DCI format in accordance with various aspects of the present disclosure.

DETAILED DESCRIPTION

Figure 1:
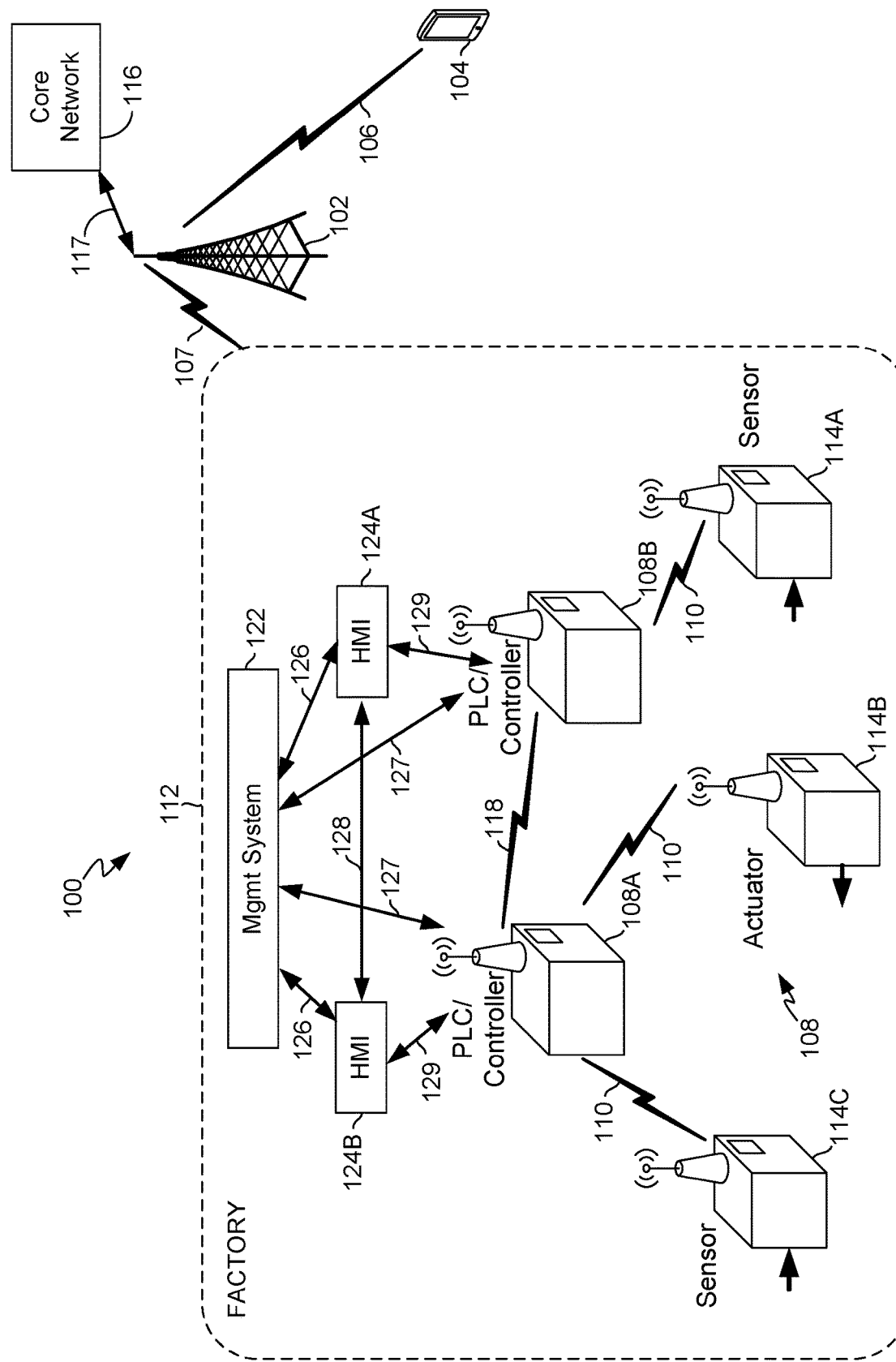
FIG. 1 is a network diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or any combination thereof. If implemented in software, the functions may be stored on or encoded as one or more instructions or code on a non-transitory computer-readable medium. Non-transitory computer-readable media include computer-readable storage media. Computer-readable storage media may be any available media that can be accessed by a computer. By way of example, and not limitation, such computer-readable storage media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Wide-area wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies. An example of an improvement to LTE technology is referred to as 5G, or NR (new radio). The terms 5G and NR represent an evolution of LTE technology including, for example, various improvements to the wireless interface, processing improvements, and the enablement of higher bandwidth to provide additional features and connectivity.

The high bandwidth, high connectivity, scalability, and other benefits that 5G technology offers may lead to the use of 5G technology in various spheres of endeavor or "use cases" beyond mobile broadband communication. For example, 5G technology may be employed in so-called "mission-critical" control systems, such as the industrial automation systems mentioned herein. The term "mission-critical" generally refers to the criticality of low latency and high reliability to achieving an objective. For this reason, mission-critical 5G services may also be referred to as ultra-reliable low-latency communications (URLLC) services. Industrial automation or other mission-critical devices that have access to LTE or 5G frequency bands may be referred to as URLLC user equipment (URLLC UE).

It is contemplated that an industrial automation device, such as a computer-based controller, sensor, etc., may have access to LTE frequency bands, 5G frequency bands, as well as unlicensed frequency bands that are commonly employed in industrial automation local-area communication. Examples of communication technologies that use unlicensed frequency bands may include, for example, WiFi, Bluetooth, or other short-range wireless communication technology.

FIG. 1 illustrates an example of a wireless communications system 100 in accordance with various aspects of the disclosure. Wireless communications system 100 includes a factory 112 and one or more base stations 102 that are configured to communicate with each other via any of various communication links, with an exemplary communication link 107 shown for exemplary purposes only. In an exemplary embodiment, the communication link 107 may comprise one or more wired and/or wireless communication links and may include an LTE and/or a 5G communication link. The base station 102 may also be in communication with one or more user equipment (UE) 104 over a communication link 106, with an exemplary UE 104 shown for illustrative purposes. Although for purposes of clarity only a single exemplary base station 102 and UE 104 is shown in FIG. 1, such a wireless communications system 100 may include any number of base stations 102 and UEs 104. In an exemplary embodiment, the base station 102 may be in communication with a core network 116 over a connection 117. The connection 117 may be a wired or a wireless connection, and, in an exemplary embodiment, may comprise a backhaul connection (such as an X2 connection), may comprise an IP network, a connection to an IP network, or may comprise some or all of a core network. For example, the core network 116 may provide user authentication, access authorization, tracking, Internet Protocol (IP) connectivity, and other access, routing, or mobility functions. The core network 116 may comprise some or all of an evolved packet core (EPC) that may provide one or more services or functions, such as those described herein. The core network 116 may comprise LTE communication capability, and may also comprise 5G (also referred to as new radio (NR) communication capability.

Wireless communications system 100 may include, for example, an LTE/LTE-A network, a 5G (or NR) network, or a heterogeneous network comprising aspects of both LTE and 5G technologies or other technologies. In LTE/LTE-A networks, the term evolved Node B (eNB), or in a 5G network, the term millimeter wave B (mWB) or gigabit Node B (gNB), may be used generally to describe base stations 102, while the term UE, mobile broadband UE, or evolved mobile broadband (eMBB) UE may be used generally to describe a UE 104. Wireless communications system 100 may be a heterogeneous LTE/LTE-A and 5G network in which different types of eNBs and/or gNB provide coverage for various geographical regions. For example, each base station 102 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, wireless communications system 100 may be, or may include, a millimeter wave communication network.

The term "NR" may be used herein to refer to "new radio," which is a way of referring to a radio interface that may be part of the 5G communication methodology. The term "NR" may be used interchangeably with the term "5G" in this disclosure.

Each base station 102 (e.g., an eNB or a gNB) may provide communication coverage for a respective geographic coverage area. A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB.

Although not shown for purposes of clarity, wireless communications system 100 may include base stations 102 of different types (e.g., macro and/or small cell base stations). There may be overlapping geographic coverage areas for different technologies.

Wireless communications system 100 may support synchronous or asynchronous operation. For synchronous operation, base stations 102 may have similar frame timing, and transmissions from different base stations may be approximately aligned in time. For asynchronous operation, base stations 102 may have different frame timing, and transmissions from different base stations may not be aligned in time.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 104 and the base stations 102 supporting radio bearers for the user plane data. At the Physical (PHY) layer, the transport channels may be mapped to physical channels.

The UE 104 may be dispersed throughout the wireless communications system 100, and each UE 104 may be stationary or mobile. A UE 104 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 104 may be a cellular phone, a personal digital assistant (PDA), a wireless modem, a wireless communication device, a handheld device, a tablet computer, a computer, a cordless phone, a wireless local loop (WLL) station, or the like. A UE 104 may be able to communicate with various types of base stations and network equipment including macro eNBs, small cell eNBs, mWBs/gNBs, relay base stations, and the like. Two UEs 104 also may be able to communicate directly with each other (i.e., not via any intermediary device such as one of base stations 102) in a manner commonly referred to as device-to-device (D2D) communication. UEs 104 in D2D communication with each other may be located either within or outside the coverage area of one of base stations 102.

Communication link 106 may carry or represent uplink (UL) transmissions from a UE 104 to a base station 102, and/or downlink (DL) transmissions from a base station 102 to a UE 104. The downlink transmissions may also be called forward link transmissions while the uplink transmissions may also be called reverse link transmissions. Each communication link 106 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication link 106 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some examples, base stations 102 and/or UEs 104 may include multiple antennas for employing antenna diversity schemes to improve communication quality and reliability between base stations 102 and UEs 104. Additionally or alternatively, base stations 102 and/or UEs 104 may employ multiple-input, multiple-output (MIMO) techniques that may take advantage of multi-path environments to transmit multiple spatial layers carrying the same or different coded data. UEs 104 may relate primarily to mobile broadband service (e.g., eMMB), in which users (not shown) may use UEs 104 to communicate with each other or with others, and to access the Internet or other remote broadband resources.

In an exemplary embodiment, the factory 112 may comprise a management system 122 and one or more human machine interface (HMI) devices, with exemplary HMI devices 124A and 124B shown for illustrative purposes only. In an exemplary embodiment, the management system 122 may comprise an industrial computing device providing controller programming and management functionality, software and security management, key performance indicator (KPI) monitoring, and other functions. In an exemplary embodiment, the HMI devices 124 may comprise one or more of tablets, panels, wearable devices, and other devices. The factory 112 may also comprise one or more controllers 108, with exemplary controllers 108A and 108B shown for illustrative purposes only, and one or more sensors/actuators 114, with exemplary sensors/actuators (S/A devices) 114A, 114B and 114C shown for illustrative purposes only. In an exemplary embodiment, when the controllers 108 are communicating with the S/A devices 114, the controllers may function as "base stations" and the one or more S/A devices 114 may function as UEs. For example, the functionality described with respect to a base station 102 may be performed by a controller 108, and the functionality described with respect to a UE 104 may be performed by an S/A device 114. The controllers 108 and the S/A devices 114 may include, for example, PLC devices, sensors, actuators, measurement devices, or other devices or types of devices used in factory automation and in general, devices that perform machine-to-machine (M2M) communication, machine type communication (MTC), or other communication types. As used herein, the term "communicating" may refer to one-way or bi-directional communication between communication devices, such as between a S/A device 114 and a controller 108. In an exemplary embodiment, the controllers 108 may comprise PLC devices that may issue commands to the S/A devices 114, that may receive inputs from the S/A devices 114, and that may communicate with other controllers 108.

The management system 122 may communicate with the HMI devices 124 over communication links 126, and may communicate with the controllers 108 over communication links 127. The HMI devices 124 may also communicate with each other over communication link 128 and with controllers 108 over communication links 129. The controllers 108 may also communicate with each other over communication link 118. The controllers 108 may also communicate with the S/A devices 114 over communication links 110. The communication links 126, 127, 128 and 129 may be wired, wireless, or combinations of wired and wireless communication links that allow the connected devices to communicate and interoperate. The communication links 110 generally refer to wireless communication links.

In an exemplary embodiment, the controllers 108 and the S/A devices 114 may perform what is referred to as ultra-reliable low-latency communication (URLLC), or another type or form of communication used in, for example, factory automation, where, for example, the controllers 108 and the S/A devices 114 may communicate directly with each other in a device-to-device methodology over unlicensed communication spectrum using unlicensed frequency bands or over licensed communication spectrum using licensed frequency bands or using a combination of unlicensed communication spectrum and licensed communication spectrum.

In exemplary embodiments described in this disclosure, controllers 108 and/or the S/A devices 114 may be URLLC UE devices. For example, a controller 108A may be an industrial automation (also referred to as factory automation) PLC device, the S/A device 114C may comprise an industrial automation sensor (e.g., a motion detector, a position sensor, a camera, a temperature sensor, etc.), and S/A device 114B may comprise an industrial automation actuator (e.g., a motor, a relay, a driver, etc.). Although for purposes of clarity only the three exemplary S/A devices 114A-114C are shown in FIG. 1, such a wireless communications system 100 may include any number of controllers 108 and S/A devices 114. In an exemplary embodiment, the controllers 108 and the S/A devices 114 may include, contain, or otherwise have access to communication technology that allow communication over a short-range wireless interface using unlicensed communication spectrum over unlicensed frequency bands, such as, for example, WiFi, Bluetooth, or other short-range wireless communication technology using licensed and/or unlicensed communication spectrum. The controllers 108 and the S/A devices 114 may also include, contain, or otherwise have access to communication technology that allow communication over a WAN-based wireless interface using licensed communication spectrum over licensed frequency bands, such as, for example, LTE, 5G, or other WAN-based wired or wireless communication technology.

In an exemplary embodiment, controllers 108A and 108B may be configured to communicate with S/A devices 114A, 114B and 114C via communication links 110. Communication links 110 may relate to communications that may occur on one or more unlicensed frequency bands or licensed frequency bands.

In the exemplary embodiments described in this disclosure, in contrast with the frequency bands (e.g., LTE, 5G) on which base station 102 and UEs 104 communicate in the manner described above, some of the frequency bands on which controllers 108 and S/A devices 114 communicate are not allocated or "licensed" to specific entities by governmental or other authorities. For example, communication links 110 may relate to communication on Bluetooth, Wi-Fi (IEEE 802.11), or similar unlicensed frequency bands, as well as communication on licensed frequency bands. Communications on unlicensed frequency bands may be limited to shorter ranges than macro-cell communications on licensed frequency bands. For example, controllers 108 and S/A devices 114 may be located within a factory 112 or other local environment and may lack the range (e.g., transmitter power) to communicate with devices located substantially outside the factory on the unlicensed frequency band.

Controllers 108 may have access to not only the one or more unlicensed frequency bands described above but also one or more licensed frequency bands over communication link 107. Communication links 107, 127 and 129 relate to communication that may occur between controllers 108, HMI devices 124, and management system 122 on one or more licensed frequency bands, which may include the same bands on which UEs 104 are configured to communicate in the manner described above.

As mentioned above, communication between the controllers 108 and the S/A devices 114 may have stringent reliability objectives and as such, it is important to ensure that signaling and data communication between the controllers 108 and the S/A devices 114 is highly reliable. For example, a typical packet size communicated between a controller 108 and an S/A device 114 may be on the order of 40-256 bytes, may have a round trip transfer (RTT) time on the order of 0.5 to 10 milliseconds (ms), and may have a packet error rate (PER) target on the order of 10e-6.

Figure 2:
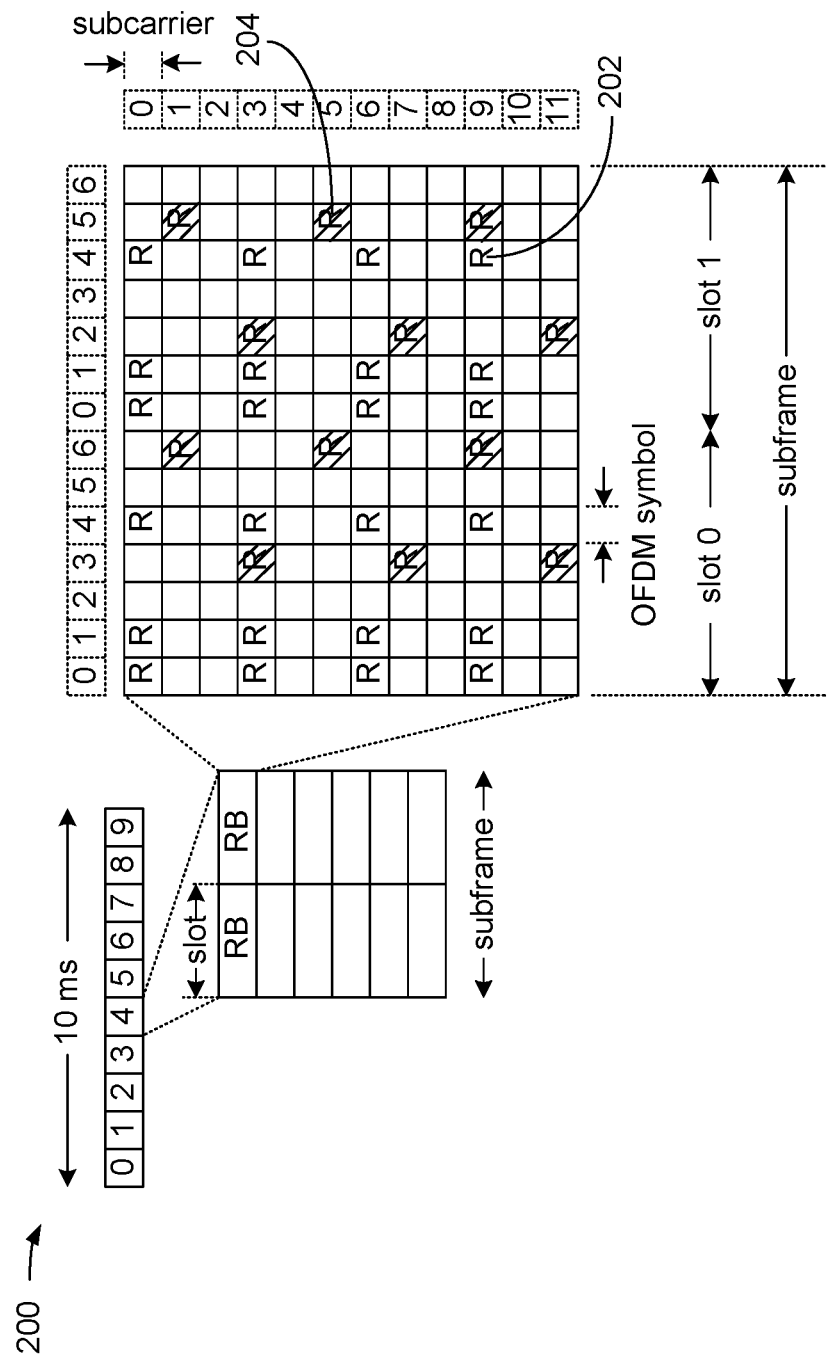
FIG. 2 is a diagram illustrating an example of a DL frame structure in LTE.

FIG. 2 is a diagram 200 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 202, 204, include DL reference signals (DL-RS) and/or downlink control information (DCI). The DL-RS include Cell-specific RS (CRS) (also sometimes called common RS) 202 and UE-specific RS (UE-RS) 204. UE-RS 204 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 3:
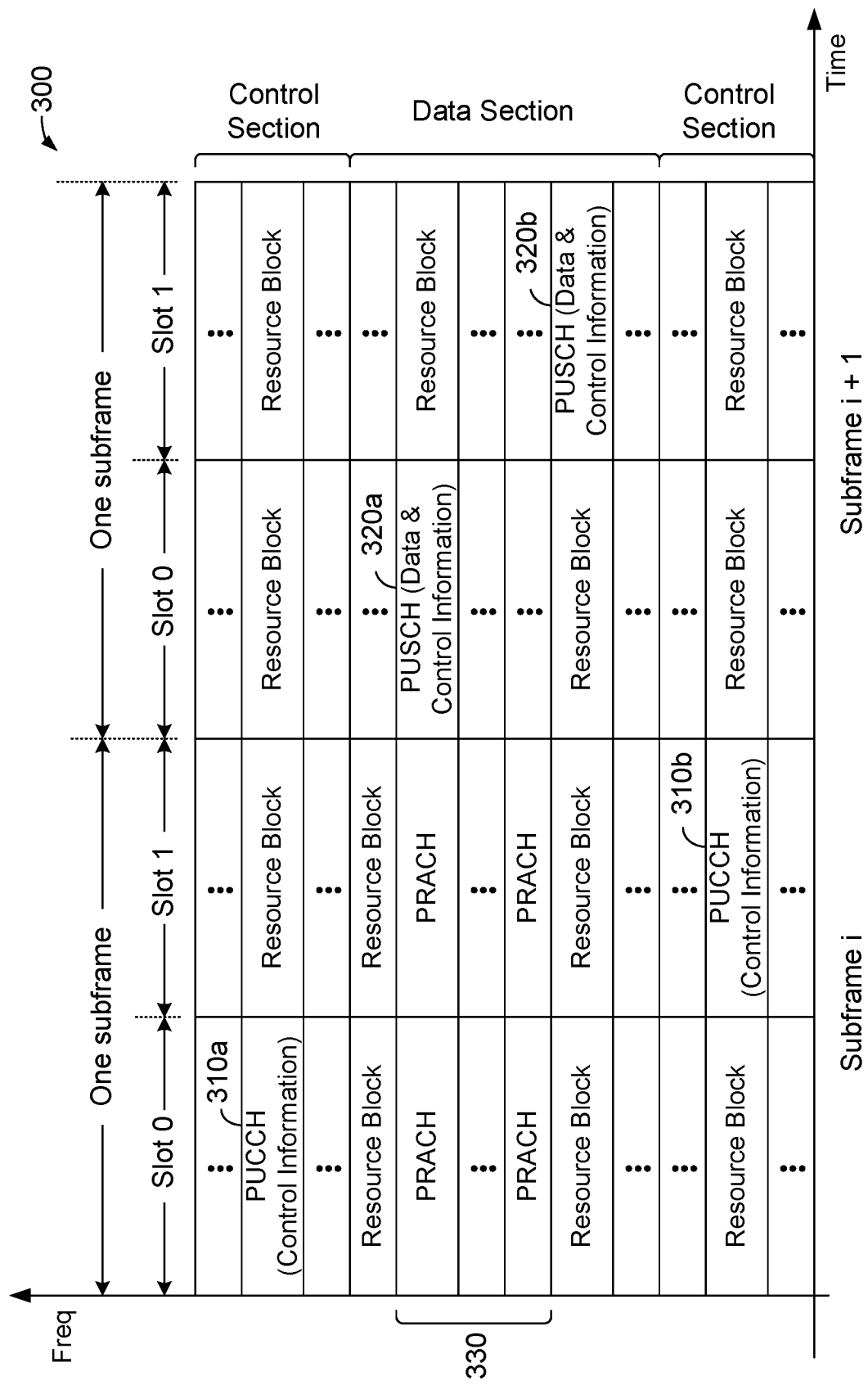
FIG. 3 is a diagram illustrating an example of an UL frame structure in LTE.

FIG. 3 is a diagram 300 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to an eNB/gNB. The UE may also be assigned resource blocks 320a, 320b in the data section to transmit data to the eNB/gNB. The UE may transmit uplink control information (UCI) in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 4:
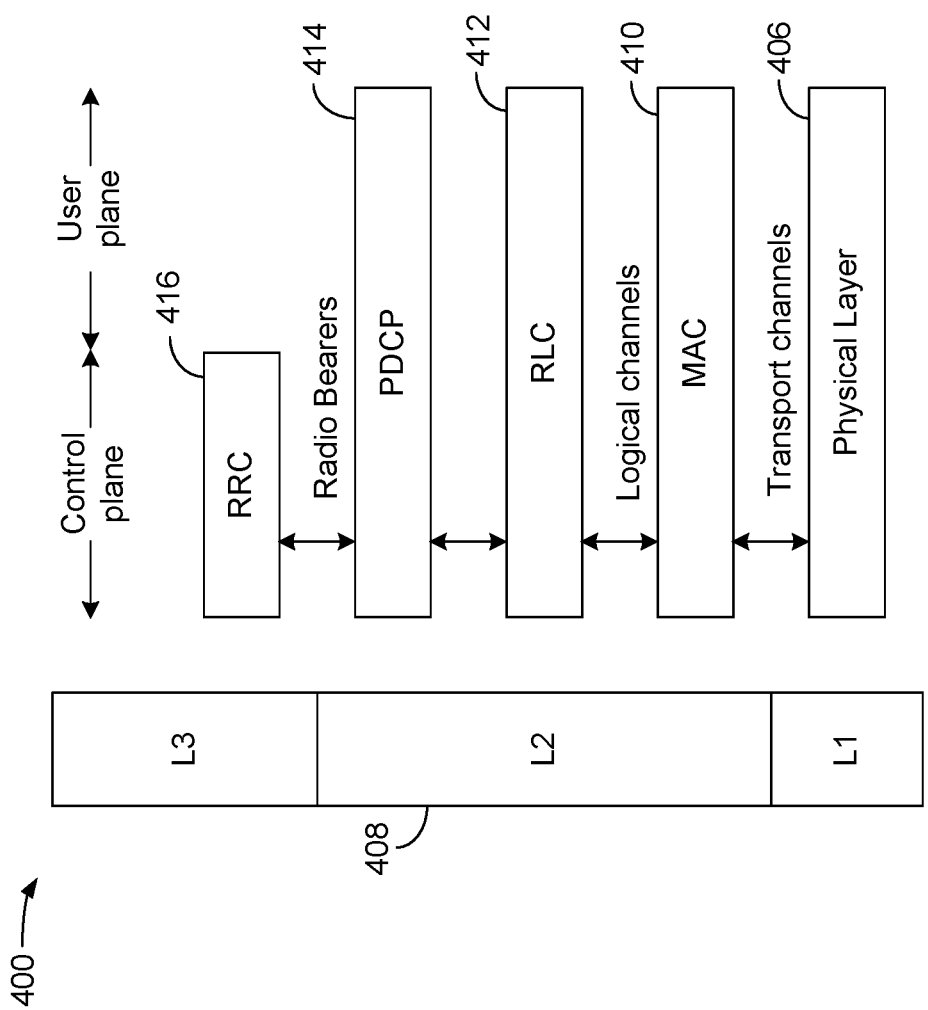
FIG. 4 is a diagram illustrating an example of a radio protocol architecture for the user and control planes in LTE in accordance with various aspects of the present disclosure.

FIG. 4 is a diagram 400 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 406. Layer 2 (L2 layer) 408 is above the physical layer 406 and is responsible for the link between the UE and eNB over the physical layer 506.

In the user plane, the L2 layer 408 includes a media access control (MAC) sublayer 410, a radio link control (RLC) sublayer 412, and a packet data convergence protocol (PDCP) 414 sublayer, which are terminated at the eNB on the network side. Although not shown, the UE may have several upper layers above the L2 layer 408 including a network layer (e.g., IP layer) that may be terminated at a PDN gateway (not shown) on the network side, and an application layer that may be terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between eNBs. The RLC sublayer 412 provides segmentation and reassembly of upper layer data packets, retransmission of lost data packets, and reordering of data packets to compensate for out-of-order reception due to hybrid automatic repeat request (HARQ). The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

In the control plane, the radio protocol architecture for the UE and eNB is substantially the same for the physical layer 406 and the L2 layer 408 with the exception that there is no header compression function for the control plane. The control plane also includes a radio resource control (RRC) sublayer 416 in Layer 3 (L3 layer). The RRC sublayer 416 is responsible for obtaining radio resources (e.g., radio bearers) and for configuring the lower layers using RRC signaling between the eNB and the UE. In an exemplary embodiment, a communication between a controller 108 and an S/A device 114 may occur over the RRC layer 416 (or another "higher" level communication or layer, such as, for example only, a non-access stratum (NAS) communication, a radio access network (RAN communication from the core network 116, or another communication), such communication including, for example, a transport block size (TBS) configuration. Such communication may "pre-configure" an S/A device 114 (or another UE) with part of the frequency domain resource allocation for future communications, and in an exemplary embodiment, may allow a future downlink control information (DCI) communication to have fewer bits than if the TBS were not pre-configured.

Figure 5:
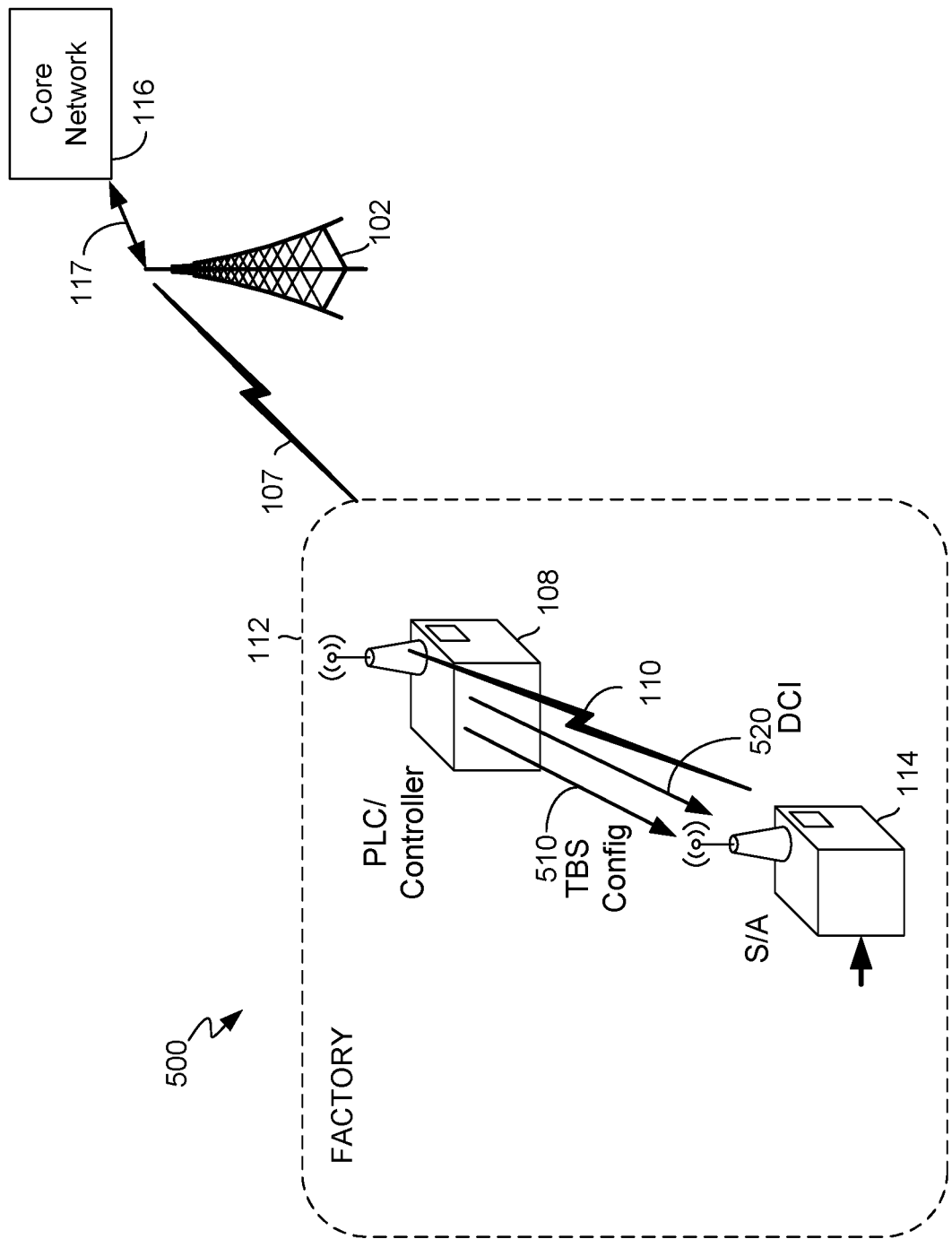
FIG. 5 illustrates an example of a communications system, in accordance with the network architecture of FIG. 1, experiencing a communication link failure between two devices on a first frequency band and communication between the two devices being restored over a second frequency band.

FIG. 5 illustrates an example of a communications system 500, in accordance with the network architecture of FIG. 1. In an exemplary embodiment, it is desirable to maximize the efficiency and the reliability of the control and data communication between a controller 108 and an S/A device 114. In an exemplary embodiment, a highly efficient control signal containing frequency resource allocation and assignment information may be provided for one or more of an uplink (UL) and/or a downlink (DL) communication between a controller 108 and a large number of S/A devices 114. Although only a single S/A device 114 is shown in FIG. 5 for simplicity of illustration, typically there may be many tens or more of S/A devices 114 in communication with each controller 108.

In an exemplary embodiment, the size and configuration of a downlink control information (DCI) communication, carried on a physical downlink control channel (PDCCH) between the controller 108 and the S/A device 114 may be optimized to support communication between a large number of UEs (S/A devices 114 in this example) and a controller 108 with high reliability. As mentioned herein, communication traffic between a controller 108 and an S/A device 114 in a factory automation environment generally comprises periodic communication using substantially fixed packet sizes. Given the substantially fixed packet size, in an exemplary embodiment, the transmission block size (TBS) for communications between the controller 108 (acting like an eNB, a gNB, or another base station in this example) and the S/A device 114 (acting like a UE in this example) can be configured through higher layer communications. As used herein, the term "higher layer" refers to communications between a base station and a UE, and/or between a controller and an S/A device using, for example, a radio resource connection (RRC) configuration message, a non-access stratum (NAS) message, a message from the radio access network (RAN) and/or a message from the core network 116. For example, one or more of a radio resource connection (RRC) configuration message, a non-access stratum (NAS) message, a message from the radio access network (RAN) and/or a message from the core network 116 may be used to "pre-configure" at least a portion of the frequency-domain resource allocation available for communication between the controller 108 and the S/A device 114, as shown using directional arrow 510. Such "pre-configured" frequency domain resources and frequency-domain resource allocation may include, for example, a transport block size (TBS), a fixed-packet length transport block size (TBS), a modulation and coding scheme (MCS), and/or the number of layers if a multiple input multiple output (MIMO) antenna scheme is used. As used herein, the "number of layers" refers to layers in the context of MIMO antenna ports and/or antenna elements, where the number of layers may be equal to one (1) or may exceed one (1), as known to those having ordinary skill in the art. Such "number of layers" information may be included in, for example, the pre-configured frequency domain resource allocation, or may be included in a DCI communication, such as in a DCI format 0_1 that may be used for scheduling a PUSCH communication or a DCI format 1_1 that may be used for scheduling a PDSCH communication. Thereafter, a modified DCI communication 520 can convey the remaining frequency-domain resource allocation information to the S/A device 114 using fewer bits than if the TBS was not previously configured. In an exemplary embodiment, the TBS can be previously configured using a higher level communication (e.g., the radio resource connection (RRC) configuration message, a non-access stratum (NAS) message, a message from the radio access network (RAN) and/or a message from the core network 116). In an exemplary embodiment, an S/A device 114 (acting like a UE) can receive the modified DCI information, and together with the pre-configured frequency-domain resources (e.g., the pre-configured TBS and if also pre-configured, the number of layers), can then infer the full frequency-domain resource allocation from the prior TBS configuration and the subsequently received modified DCI communication. Such a modified DCI communication may also be referred to as a DCI communication having a compressed resource-allocation indication. In an exemplary embodiment, instead of a TBS, the pre-configuration of the TBS may also include, or be performed by, a function of the TBS, a max TBS, etc. Examples of a function of the TBS may include, a TBS+k configuration (where "k" may be a fixed or variable integer value), a (1+delta)*TBS configuration (where "delta" may be a fixed or variable integer value), and a maximum (max) TBS value configuration, where max TBS may be the maximum size that a TBS may take in a particular implementation. In an exemplary embodiment, various implementations may allow for variability in the TBS and/or the manner in which the TBS configuration is signaled to an S/A device 114 prior to the modified DCI communication. Such examples of pre-configuring the TBS configuration using a transport block size TBS configuration, a fixed-packet size transport block size (TB S) configuration or a function of the TBS as mentioned above are not exhaustive or limited to those mentioned.

For example, if the TBS is pre-configured as described herein, for NR resource allocation in a type 1 DCI communication, only the start resource block (RB) location may be specified in the modified DCI communication 520, thereby reducing the size of the modified DCI communication compared to a non-modified DCI communication. In an exemplary embodiment, after receiving the location of the starting RB in the modified DCI communication 520 in a communication stream, a UE can then infer the number of RBs using one or more of the pre-configured TBS, the modulation and coding scheme (MCS) and, if not pre-configured in, for example, an RRC communication, a precoding information and number of layers (transmitted precoding matrix identifier (TPMI)) field in a DCI format 0_1 or a DCI format 1_1 communication. In this manner, the modified DCI communication 520 having the starting resource block location can be sent using fewer communication resources than if the TBS pre-configuration did not occur, and the entire frequency resource allocation information had to be sent in a conventional DCI communication.

In an exemplary embodiment, when the TBS is pre-configured, the number of bits in the modified DCI that indicate the frequency-domain resource assignment of a type 1 DCI can be reduced from "ceil(log 2(n_RB (n_RB+1)/2)) bits (as specified in NR Re1.15 TS38.212) where n_RB is the total number of RBs", to "ceil(log 2(n_RB)) bits." For example, in an exemplary embodiment for n_RB=50, the reduction in bits conveying the frequency resource assignment in the modified DCI is reduced from 11 bits to 6 bits. For a larger number of RBs, the bit reduction would be higher. This methodology applies for both DL (DCI 1_0) and UL (DCI 0_0) resource assignment indication. The bit value should be an integer value. As used herein, the term "ceil" refers to rounding up the bit value to the next integer value. In an exemplary embodiment, a modified DCI may include combined DL and UL resource allocation (RA) indication. In an exemplary embodiment, RBs can correspond to physical resource blocks (PRBs) or virtual resource blocks (VRBs). For example, for frequency diversity, a VRB-to-PRB mapping can be used to provide non-contiguous resource allocation. VRB-to-PRB mapping is known to those having ordinary skill in the art and may be conveyed in a DCI Format 0_1 (for a PUSCH) or a DCI Format 1_1 (for a PDSCH) communication. In an exemplary embodiment, for a transmitter with a different TBS than configured through an RRC communication, a fall back DCI can be utilized. This situation should be infrequent given the traffic profile in a factory automation implementation.

In an exemplary embodiment where transmissions are mainly of fixed packet sizes, e.g., in factory automation, a base station (or a controller) can send a modified DCI with fewer frequency-domain resource allocation bits based on a prior pre-configuration of the TBS through higher layers, e.g., RRC configuration, NAS message, etc., as mentioned above.

In an exemplary embodiment, a UE can infer the full frequency-domain resource assignment based on a combination of the higher-layer TBS pre-configuration and the subsequently received modified DCI having the compressed resource allocation indication.

In an exemplary embodiment, the described TBS configuration and modified DCI communication may be applicable to a DL DCI (e.g., for a PDSCH), an UL DCI (e.g., for a PUSCH), or both DL and UL DCI based on when the traffic profile is amenable to such methodology, as well as when a combined DCI carrying both UL/DL assignments is used.

In an exemplary embodiment, for transmissions using a TBS that may be different from that pre-configured through the above-mentioned higher layer TBS configuration communication, a fall back (or legacy) DCI communication can be utilized to convey the complete resource assignment.

Figure 6:
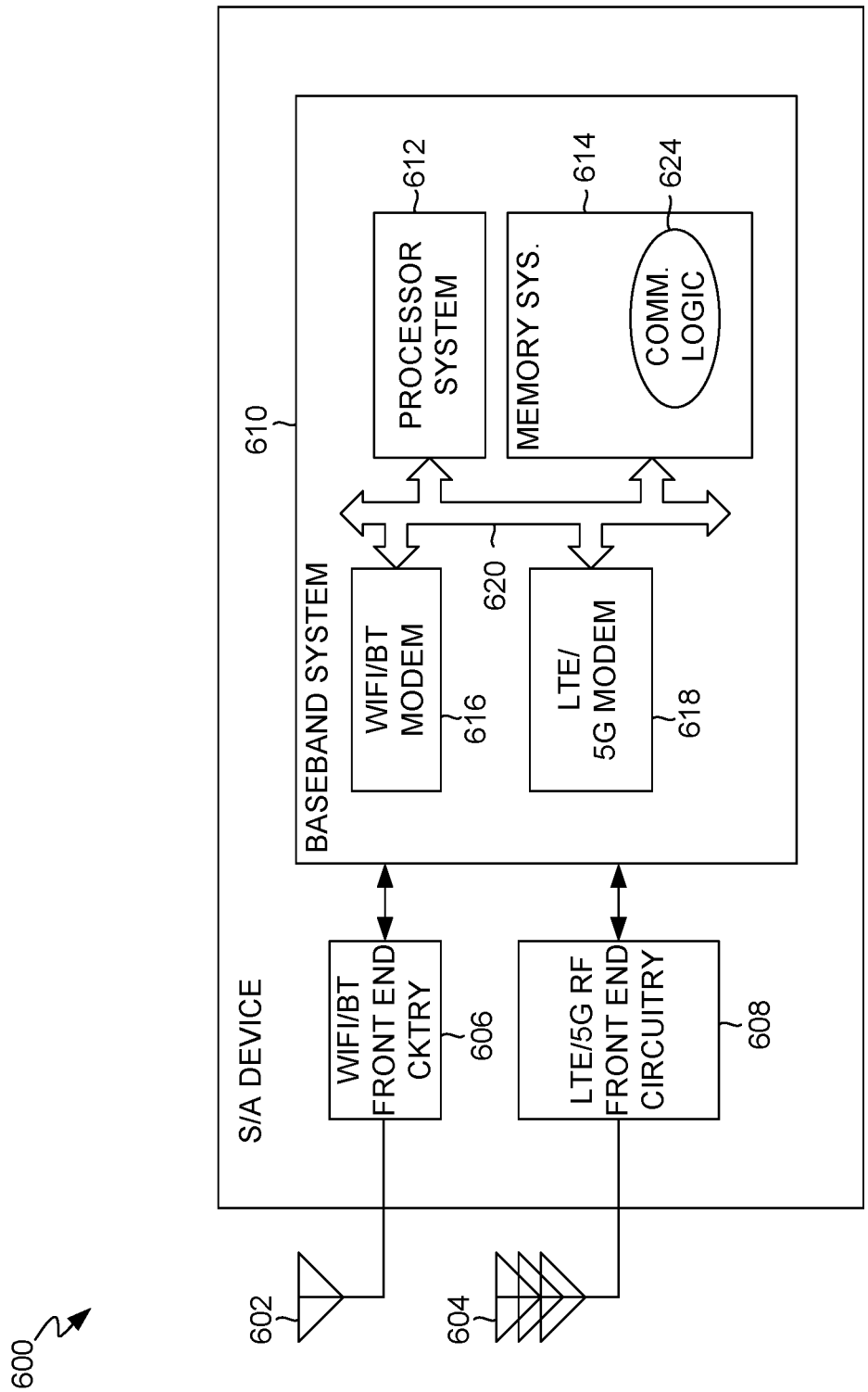
FIG. 6 is a block diagram of an exemplary device, in accordance with various aspects of the present disclosure.

FIG. 6 is a block diagram of an exemplary device 600, which may be an example of an S/A device 114A, 114B, 114C, or any device 114. Although in the exemplary embodiments described in this disclosure, device 600 may be a factory automation sensor or actuator of the types described above, in other embodiments such a URLLC UE device may be of any other type having access to one or more frequency bands. The device 600 may include one or more first frequency band antennas 602 and one or more second frequency band antennas 604. For example, first frequency band antennas 602 may be WiFi antennas, Bluetooth antennas, or antennas for another unlicensed communication spectrum. The second frequency band antennas 604 may be LTE antennas, 5G antennas, or antennas for another licensed communication spectrum. The device 600 may further include WiFi/Bluetooth RF front end circuitry 606 coupled to antennas 602, and LTE/5G RF front end circuitry 608 coupled to antennas 604. The device 600 may also include baseband system 610. The baseband system 610 may include a processor system 612 and a memory system 614. The baseband system 610 may also include a WiFi/Bluetooth modem 616 and an LTE/5G modem 618. The processor system 612, memory system 614, WiFi/Bluetooth modem 616, and LTE/5G modem 618 may communicate, directly or indirectly, with each other (e.g., via one or more buses 620). A processing system comprising the processor system 612 and the memory system 614 may be configured to receive and process a modified DCI communication as described herein.

A portion of the foregoing functionality may be performed under the control of processor system 612 through the execution of logic or instructions in the form of software, firmware, etc. In addition, some or all of the communication methods described in this disclosure may be performed under the control of processor system 612 through the execution of communication logic 624. In the example shown in FIG. 6, memory system 614 is configured with, among other things, communication logic 624. In this example, communication logic 624 may be in the form of software or firmware. More generally, memory system 614 or other memory (not shown) may be configured with software or firmware, which, when executed by processor system 612 or other processors (not shown), causes device 600 to control various methods, including the methods described in this disclosure. Although not shown for purposes of clarity, memory system 614 also may be configured with other software or firmware, which, when executed by processor system 612 or other processes, causes device 600 or its processing system to control methods relating to factory automation or other conventional methods, such as, for example, obtaining sensor readings from device 114B (FIG. 1), processing such sensor readings or other data, etc. Although for purposes of clarity communication logic 624 is shown in FIG. 6 in a conceptual manner as stored in or residing in memory system 614 in the manner of software or firmware, it should be understood that communication logic 624 may be made accessible to processor system 612 in any manner. Also, it should be noted that memory system 614 is an example of a computer program product comprising a non-transitory computer-readable medium having stored therein in non-transitory computer-executable form, instructions (e.g., communication logic 624) which, when executed by processor system 612, may effect the methods of operation described in this disclosure. Some or all of baseband system 610 and RF front end circuitry 606 and 608 may be implemented using one or more application-specific integrated circuits (ASICs) adapted to control some or all of the associated methods or functions described herein. The WiFi/Bluetooth RF front end circuitry 606 and the LTE/5G RF front end circuitry 608 may include one or more transmitters and receivers, or transceivers, and related circuitry configured to transmit and receive communication signals. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Figure 7:
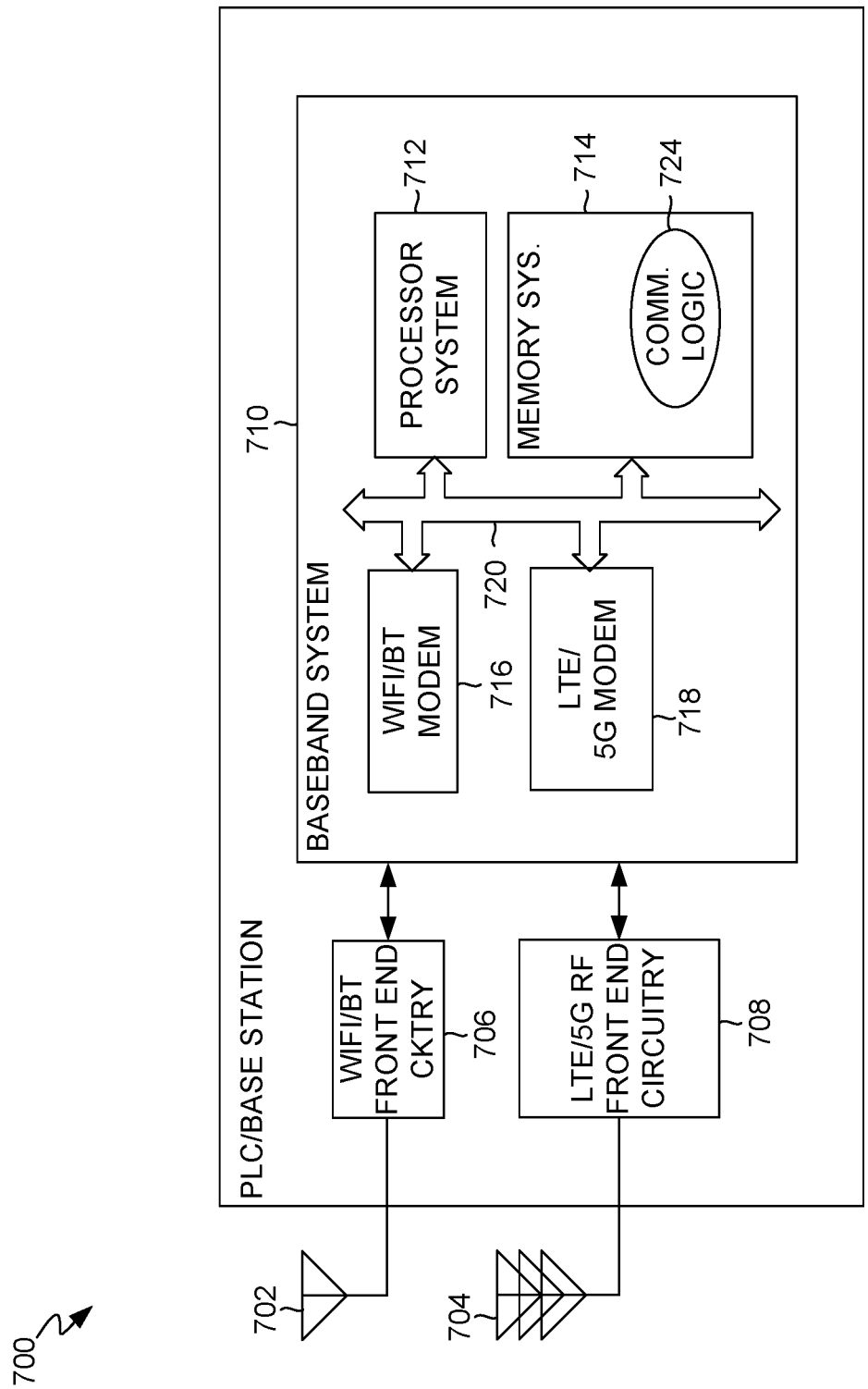
FIG. 7 is a block diagram of an exemplary device, which may be an example of a base station, in accordance with various aspects of the present disclosure.

FIG. 7 is a block diagram of an exemplary device 700, which may be an example of a controller 108 or a base station 102 of FIG. 1. The device 700 may include one or more first frequency band antennas 702 and one or more second frequency band antennas 704. For example, first frequency band antennas 702 may be WiFi antennas, Bluetooth antennas, or antennas for another unlicensed communication spectrum. The second frequency band antennas 704 may be LTE antennas, 5G antennas, or antennas for another licensed communication spectrum. The device 700 may further include WiFi/Bluetooth RF front end circuitry 706 coupled to antennas 702, and LTE/5G RF front end circuitry 708 coupled to antennas 704. The device 700 may also include baseband system 710. The baseband system 710 may include a processor system 712 and a memory system 714. The baseband system 710 may also include a WiFi/Bluetooth modem 716 and an LTE/5G modem 718. The processor system 712, memory system 714, WiFi/Bluetooth modem 716, and LTE/5G modem 718 may communicate, directly or indirectly, with each other (e.g., via one or more buses 720).

A portion of the foregoing functionality may be performed under the control of processor system 712 through the execution of logic or instructions in the form of software, firmware, etc. In addition, some or all of the communication methods described in this disclosure may be performed under the control of processor system 712 through the execution of communication logic 724. In the example shown in FIG. 7, memory system 714 is configured with, among other things, communication logic 724. In this example, communication logic 724 may be in the form of software or firmware. More generally, memory system 714 or other memory (not shown) may be configured with software or firmware, which, when executed by processor system 712 or other processors (not shown), causes device 700 to control portions of various methods, including portions of the methods described in this disclosure. Although not shown for purposes of clarity, memory system 714 also may be configured with other software or firmware, which, when executed by processor system 712 or other processes, causes device 700 or its processing system to control methods relating to communication with devices 108 and UEs 104. Although for purposes of clarity communication logic 724 is shown in FIG. 7 in a conceptual manner as stored in or residing in memory system 714 in the manner of software or firmware, it should be understood that communication logic 724 may be made accessible to processor system 712 in any manner. Also, it should be noted that memory system 714 is an example of a computer program product comprising a non-transitory computer-readable medium having stored therein in non-transitory computer-executable form, instructions (e.g., communication logic 724) which, when executed by processor system 712, may effect the methods of operation described in this disclosure. Some or all of baseband system 710, WiFi/Bluetooth RF front end circuitry 706 and RF front end circuitry 708 may be implemented using one or more application-specific integrated circuits (ASICs) adapted to control some or all of the associated methods or functions described herein. The WiFi/Bluetooth RF front end circuitry 706 and the LTE/5G RF front end circuitry 708 may include one or more transmitters and receivers, or transceivers, and related circuitry configured to transmit and receive communication signals. Alternatively, the methods or functions may be controlled by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art.

Figure 8:
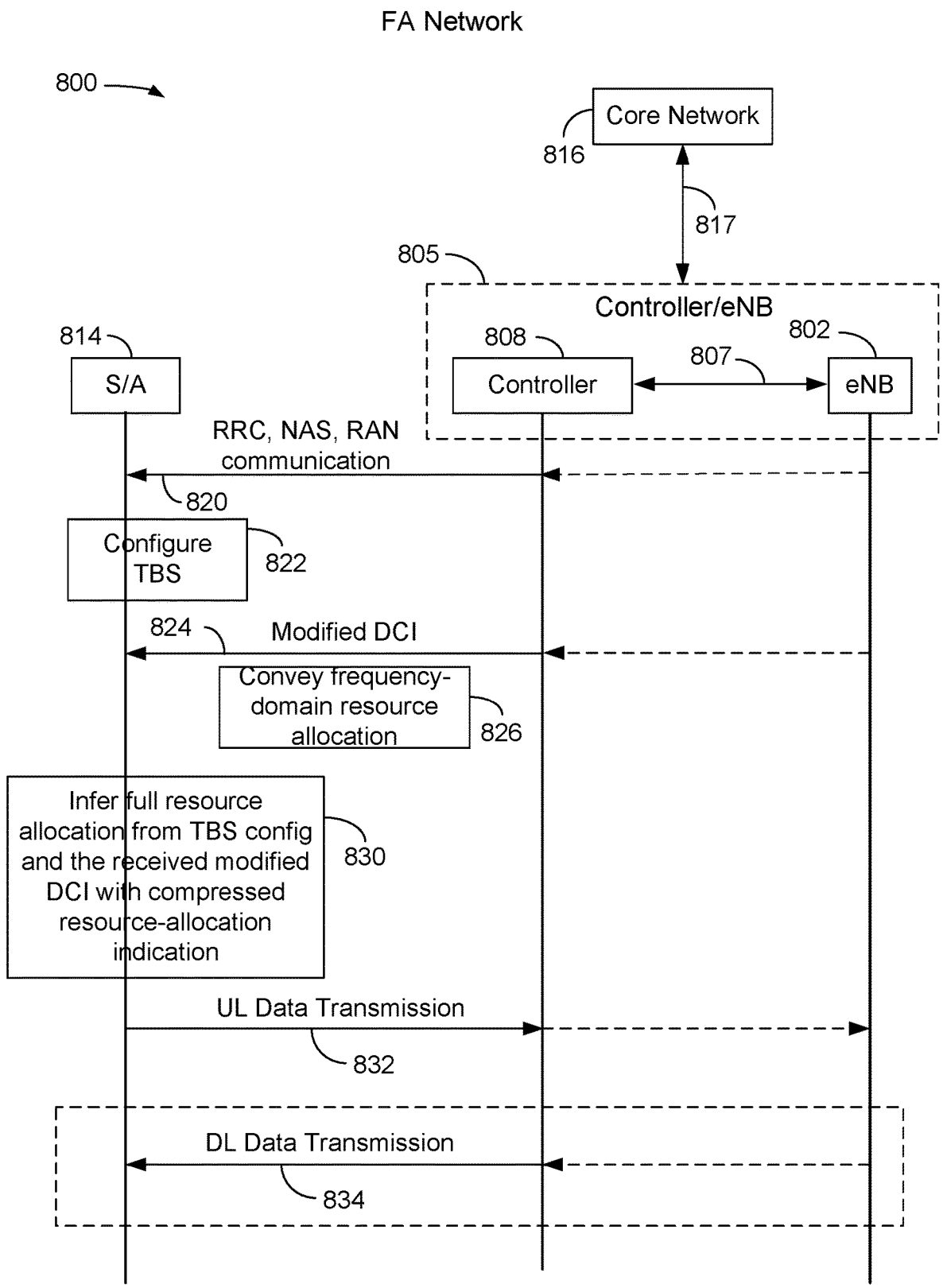
FIG. 8 is a call flow diagram illustrating a first exemplary embodiment in accordance with various aspects of the present disclosure.

FIG. 8 is a call flow diagram 800 illustrating a first exemplary embodiment in accordance with various aspects of the present disclosure. Communication is illustrated between and among a controller 808, an S/A 814 and, in some exemplary embodiments, a base station 802 and a core network 816. The controller 808 may be similar to the controllers 108 of FIGS. 1 and 5, the S/A device 814 may be similar to the S/A devices 114 of FIGS. 1 and 5, the base station 802 may be similar to the base station 102 described in FIGS. 1 and 5 and the core network 816 may be similar to the core network 116 described in FIGS. 1 and 5. In an exemplary embodiment, a controller 808 may function like a base station when communicating with an S/A 814, in which instance the calls and operations shown in FIG. 8 would occur between the controller 808 and the S/A device 814, as shown in solid line. In other exemplary embodiments, a base station 802 may also be in communication with a controller 808 over a connection 807 (which is similar to the connection 107 of FIGS. 1 and 5), or a controller 808 may be integrated with or within a base station 802, in which case FIG. 8 illustrates a dotted line including the controller 808 and the base station 802, and refers to this combined device as a controller/eNB 805. Although referred to as an "eNB", the base station 802 and the controller/eNB 805 may also be referred to as a "gNB" for a NR network. In an exemplary embodiment, one or more of the controller/eNB 805, the controller 808 and/or the base station 802 may be in communication with a core network 816 over a communication link 817, which is similar to the communication link 117 of FIGS. 1 and 5. The dotted lines indicating the flow of communication signals between the controller 808 and the base station 802 signify communication calls that would occur if the function of the controller 808 and function of the base station 802 were separate, but the elements included in the controller/eNB 805.

In call 820, a communication from the controller 808 to the S/A device 814 may include information relating to a pre-configuration of a transport block size (TBS) that the S/A device 814 may use to obtain pre-existing knowledge of at least some portion of the frequency resource assignment for future communications between the S/A device 814 and the controller 808. In an exemplary embodiment, the call 820 may comprise one or more of a radio resource connection (RRC) configuration message, a non-access stratum (NAS) message, a message from the radio access network (RAN) and/or a message from the core network 816, may include the TBS portion of the frequency-domain resource assignment (or allocation) and may be used to "pre-configure" at least a portion of the frequency-domain resources available to the S/A device 814 for communication between the controller 808 and the S/A device 814. In block 822, an S/A device 814 may configure its TBS in accordance with the information contained in the message in call 820.

In call 824, the controller 808 may send a modified DCI communication to the S/A device 814. In an exemplary embodiment, the call 824 may include a modified DCI conveying an additional portion of frequency domain resource allocation information to the S/A device 814 using fewer bits than if the TBS was not pre-configured in call 820 and block 822. For example, a modified DCI communication in call 824 can convey the additional frequency-domain resource allocation, as shown in block 826, for an uplink (UL) data transmission, a downlink (DL) data transmission or both an UL data transmission and a DL data transmission with fewer bits than would otherwise be used for frequency domain resource assignment where the TBS was not pre-configured and an unmodified DCI communication was used to fully convey the frequency-domain resource allocation to the S/A device 814. In an exemplary embodiment, the modified DCI communication in call 824 may include information related to the location of the beginning resource block (RB) of the frequency-domain resource allocation for the S/A device 814.

In an exemplary embodiment, in block 830, an S/A device 814 (acting like a UE) can receive the modified DCI information, and together with the previously received pre-configured TBS including a portion of the frequency-domain resources, infer the full resource allocation from the TBS pre-configuration and the received modified DCI having compressed resource-allocation indication from block 826. In this manner, the S/A device 814 can be capable of one or more of UL data transmission, DL data reception, or a combination of UL and DL data communication with the controller 808.

In call 832, an S/A device 814 sends an uplink (UL) data transmission to the controller 808.

In call 834, an S/A device 814 receives a downlink (DL) data transmission from the controller 808. The downlink (DL) data transmission from the controller 808 to the S/A device 814 shown in call 834 is shown in dotted line because it may be an optional communication.

Figure 9:
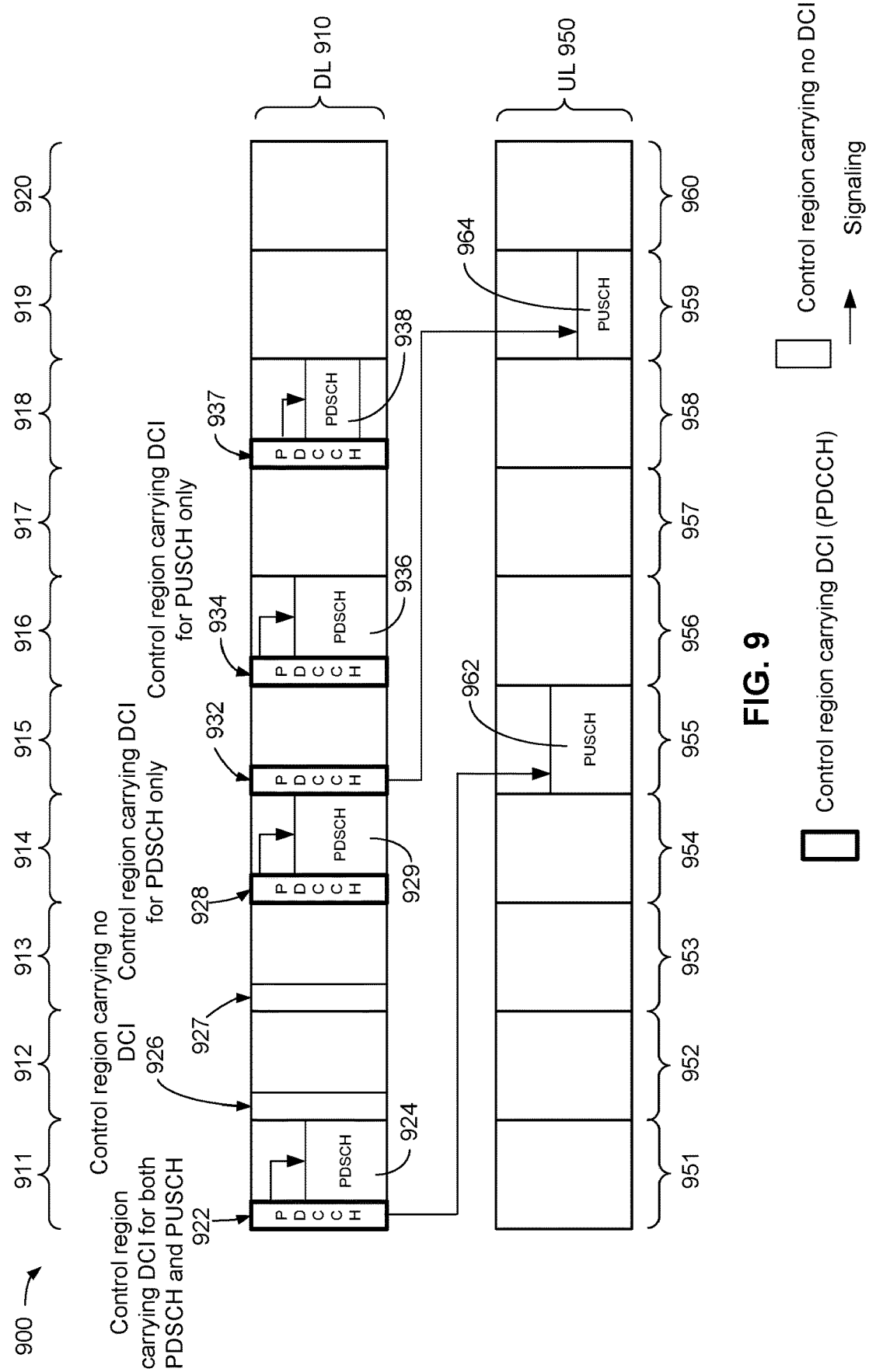
FIG. 9 is a diagram showing a communication frame structure in accordance with various aspects of the present disclosure.

FIG. 9 is a diagram 900 showing a communication frame structure in accordance with various aspects of the present disclosure. A DL communication frame 910 may include ten (10) subframes 911 through 920 and an uplink (UL) communication frame 950 may include ten (10) subframes 951 through 960.

In an exemplary embodiment, at least some of the subframes 911 through 920 in the DL communication frame 910 may have a control region carrying a DCI communication. In an exemplary embodiment, a DCI communication may be carried in a physical downlink control channel (PDCCH). For example, the subframe 911 includes a control region 922 carrying DCI for a physical downlink shared channel (PDSCH) 924 in the DL frame 910 (in subframe 911) and also carrying DCI for a physical uplink shared channel (PUSCH) 962 in the UL communication frame 950 (in the subframe 955). In this exemplary embodiment, the DCI in the control region 922 is considered a combined DL and UL DCI.

In an exemplary embodiment, a subframe may have a control region that does not carry a DCI communication. For example, control region 926 in subframe 912 and control region 927 in subframe 913 carry no DCI.

In an exemplary embodiment, a subframe may have a control region that carries a DCI only for a downlink (PDSCH). For example, control region 928 in subframe 914, control region 934 in subframe 916 and control region 937 in subframe 918 carry DCI for respective PDSCHs 929, 936 and 938. In this exemplary embodiment, the DCI in the control regions 928, 934 and 937 are considered DL DCIs.

In an exemplary embodiment, a subframe may have a control region that carries a DCI only for an uplink (PUSCH) only. For example, control region 932 in subframe 915, carries DCI for PUSCH 964 only. In this exemplary embodiment, the DCI in the control region 932 is considered an UL DCI.

In accordance with an exemplary embodiment, a DCI modified in accordance with the various aspects of the present disclosure may be a DL DCI only, an UL DCI only, and/or a combined DL and UL DCI only.

FIG. 10 is a drawing showing an exemplary embodiment of a DCI format 1000 in accordance with various aspects of the present disclosure. In an exemplary embodiment, a DCI format 1_0 is shown in FIG. 10 for purposes of illustration only in that the various embodiments of the present disclosure may be implemented with other DCI formats, such as, for example, DCI Format 0_0 for a PUSCH. The DCI format 1000 may comprise a number of fields, with each field having an item, a number of bits, and a reference. For example, in this exemplary embodiment, the field "Identifier for DCI formats" uses one (1) bit and is always set to 1, meaning that this exemplary DCI format is for a downlink (DL) resource assignment. Other DCI formats pertaining to uplink (UL) communications and combined DCI formats for combined DL and UL communications are also possible.

In an exemplary embodiment, the "Frequency domain resource assignment" field 1010 may comprise a variable number of bits. In an exemplary embodiment, where the TBS may be pre-configured as described herein, the number of DCI bits can be reduced for the frequency-domain resource assignment of a type 1 DCI from "ceil(log 2(n_RB (n_RB+1)/2))" bits (as specified in NR Re1.15 TS38.212) where n_RB is the total number of RBs, to "ceil(log 2(n_RB))" bits. For example, for n_RB=50, the reduction is from 11 bits in a conventional DCI communication to 6 bits in the modified DCI communication described herein.

A "VRB-to-PRB mapping" field 1020 may comprise one (1) bit to indicate mapping of physical resource blocks (PRBs) to virtual resource blocks (VRBs). For example, for frequency diversity, a VRB-to-PRB mapping can be used to provide non-contiguous resource allocation.

A "Modulation and Coding Scheme" (MCS) field 1030 may comprise up to five (5) bits to indicate the modulation and coding scheme for a particular PDSCH communication. The other fields in the DCI format 1000 are known to those having ordinary skill in the art and are not described in detail.

Figure 11:
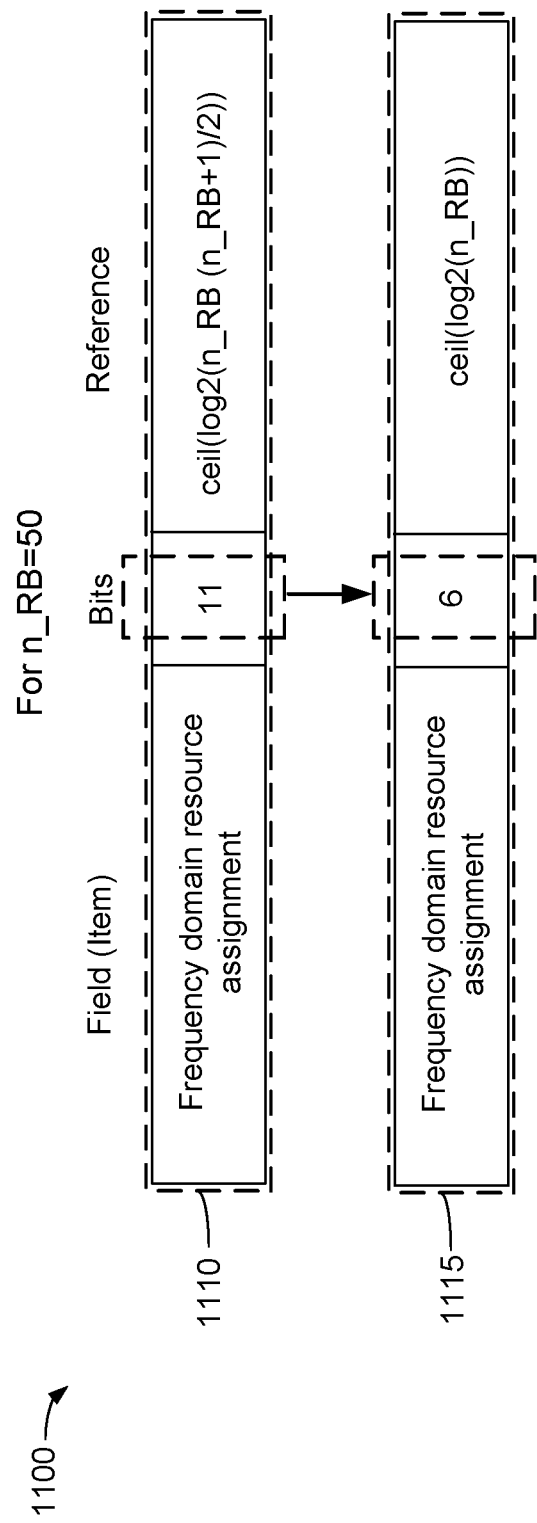
FIG. 11 is a drawing showing an exemplary embodiment of a "frequency domain resource assignment" field in a DCI format in accordance with various aspects of the present disclosure.

FIG. 11 is a drawing 1100 showing an exemplary embodiment of a "Frequency domain resource assignment" field in an unmodified DCI format 1110 and a "Frequency domain resource assignment" field in a modified DCI format 1115 in accordance with various aspects of the present disclosure. In an exemplary embodiment where the number of resource blocks is 50, the number of bits used to send the frequency domain resource assignment may be reduced from 11 bits to 6 bits. The modified DCI format 1115 may be considered to have "compressed resource allocation (RA)" information compared to the DCI format 1110.

Figure 12:
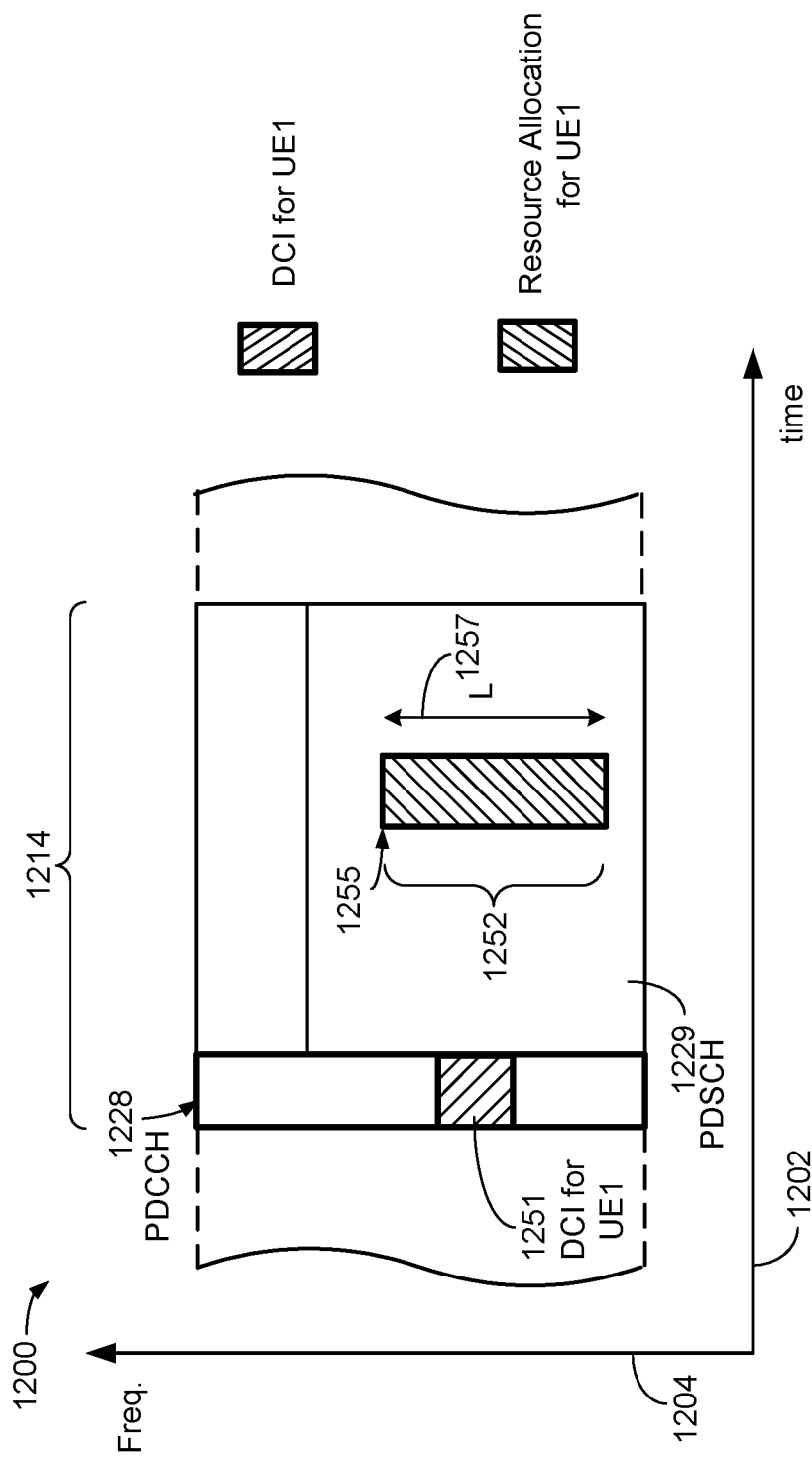
FIG. 12 is a diagram showing a part of a communication subframe in accordance with various aspects of the present disclosure

FIG. 12 is a diagram 1200 showing a part of a communication subframe in accordance with various aspects of the present disclosure. The diagram 1200 shows a portion of the communication frame structure of FIG. 9. The diagram 1200 shows a horizontal axis 1202 showing time increasing to the right, and a vertical axis 1204 showing frequency increasing upwardly. In an exemplary embodiment, a subframe 1214 includes a PDCCH control region 1228 that carries a DCI for a downlink (PDSCH) 1229. In an exemplary embodiment, the subframe 1214 is similar to the subframe 914 of FIG. 9, the control region 1228 is similar to the control region 928 of FIG. 9, and the PDSCH 1229 is similar to the PDSCH 929 of FIG. 9.

In an exemplary embodiment, the PDCCH control region 1228 in the subframe 1214 carries a modified DCI 1251 for the PDSCH 1229. In this exemplary embodiment, the modified DCI 1251 in the PDCCH control region 1228 is considered a DL DCI for a subject UE, which can be referred to as UE1. In an exemplary embodiment, the PDSCH 1229 comprises a resource assignment 1252 for the subject UE, UE1. In an exemplary embodiment, at least a portion of the resource assignment 1252 is identified by, and corresponds to, the modified DCI 1251. In an exemplary embodiment, the resource assignment 1252 comprises a beginning resource block (RB) location 1255, and a length, L, 1257. The resource assignment 1252 may comprise a number of resource blocks (RBs) (not individually shown in FIG. 12), spanning a range of contiguous and/or non-contiguous frequencies, where each RB comprises a range of frequency subchannels (see, e.g., FIG. 2). The beginning resource block (RB) location 1255 of the resource assignment 1252 may be the only portion of the resource assignment 1252 that is identified in the modified DCI 1251. In an exemplary embodiment, the beginning resource block (RB) location 1255 corresponds to a particular frequency at which the resource assignment 1252 begins. For example, the beginning resource block (RB) location 1255 can be identified by the six exemplary bits in the "Frequency domain resource assignment" field in the modified DCI format 1115 (FIG. 11) and carried in the exemplary modified DCI 1251, and may correspond to a carrier bandwidth part (BWP), which may comprise a contiguous set of physical resource blocks selected from a contiguous subset of the common resource blocks for a given numerology on a given carrier.

In an exemplary embodiment, a conventional DCI would include sufficient information to define both the beginning resource block (RB) location 1255 and the total length, L, 1257 (i.e., the number of RBs) in the resource assignment 1252. In accordance with an exemplary embodiment, the modified DCI 1251 includes information related only to the beginning resource block (RB) location 1255 of the resource assignment 1252, thereby allowing the modified DCI 1251 to contain fewer bits, as mentioned above, than a DCI that conveys the entire frequency resource assignment 1252. In an exemplary embodiment, the total length, L, 1257 (i.e., the number of RBs) in the resource assignment 1252 can be inferred by a UE from the pre-configured TBS, as mentioned above. Further, the MCS and the number of layers can also be used by the UE to infer the resource assignment, as mentioned above. For example, if the TBS is 30 bytes, the MCS is rate ½, QPSK (quadrature phase-shift keying), and the number of layers is one (1), then the number of resource blocks (RBs) in the total length, L, 1257 of the resource assignment 1252 can be inferred as:

RB=30×8/12; so that the length, L, 1257 is RB=20, where the 30 bytes are multiplied by 8 (8 bits/byte).

In this manner, the modified DCI 1251 carries information relating only the beginning resource block (RB) location 1255, so that the total length 1257, L, of the resource assignment 1252 can be inferred by the UE using the TBS pre-configuration information mentioned above and the information relating only the beginning resource block (RB) location 1255.

Figure 13:
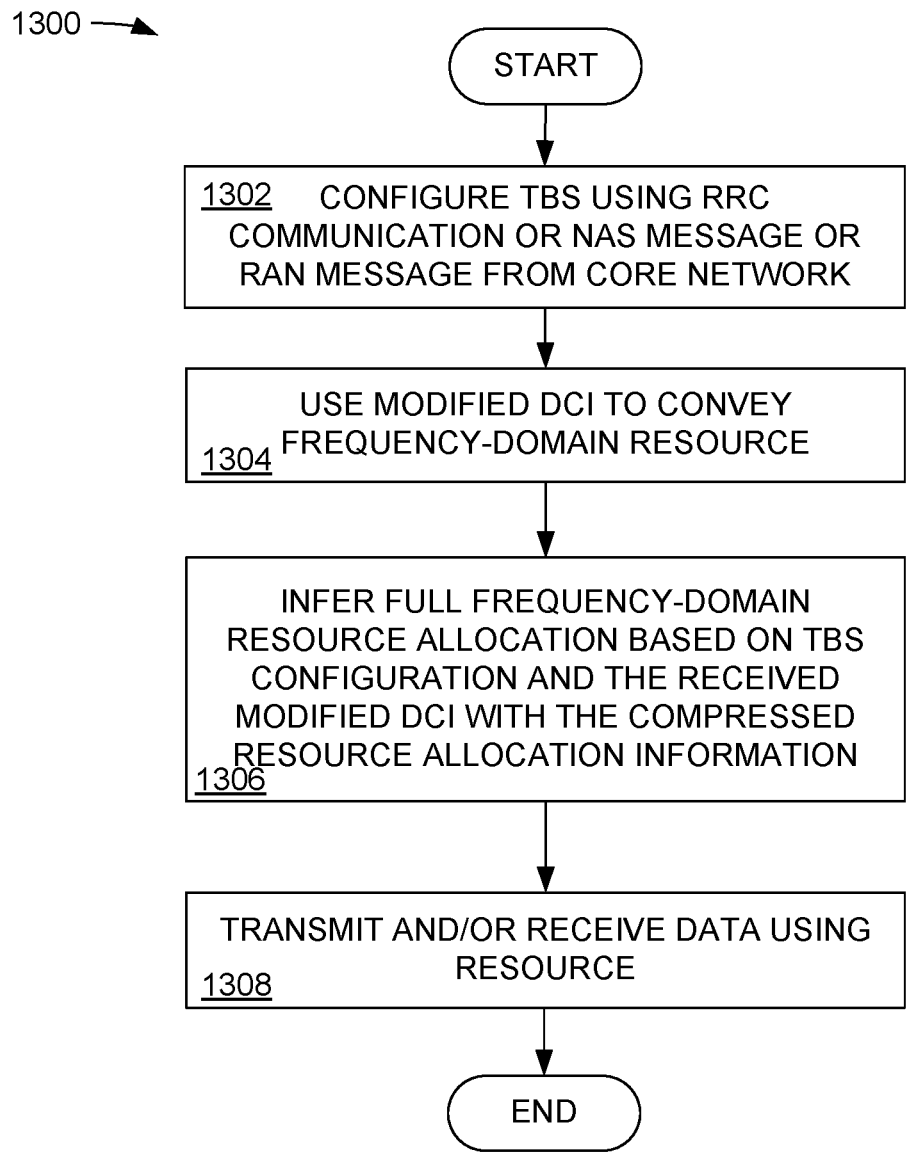
FIG. 13 is a flow chart illustrating an example of a method for communication, in accordance with various aspects of the present disclosure.

FIG. 13 is a flow chart illustrating an example of a method 1300 for communication, in accordance with various aspects of the present disclosure. The blocks in the method 1300 can be performed in or out of the order shown, and in some embodiments, can be performed at least in part in parallel.

In block 1302, an S/A device 114 may be configured with a TBS by receiving an RRC communication, a NAS message, and/or a RAN message, or another higher layer communication, from a controller 108, a base station 102, or from a core network 116. This configuring of the S/A device 114 may be considered a TBS pre-configuration, as described herein.

In block 1304, a modified DCI communication is received by a S/A device 114 and is used to convey to the S/A device 114 frequency-domain resource assignment using fewer bits than if the TB S were not pre-configured in block 1302.

In block 1306, an S/A device 114 (or a UE) may infer the full frequency-domain resource assignment or allocation based on the pre-configured TBS configuration and the modified DCI having the compressed resource allocation.

In block 1308, the S/A device 114 (or a UE) transmits and/or receives data using the identified resource.

Figure 14:
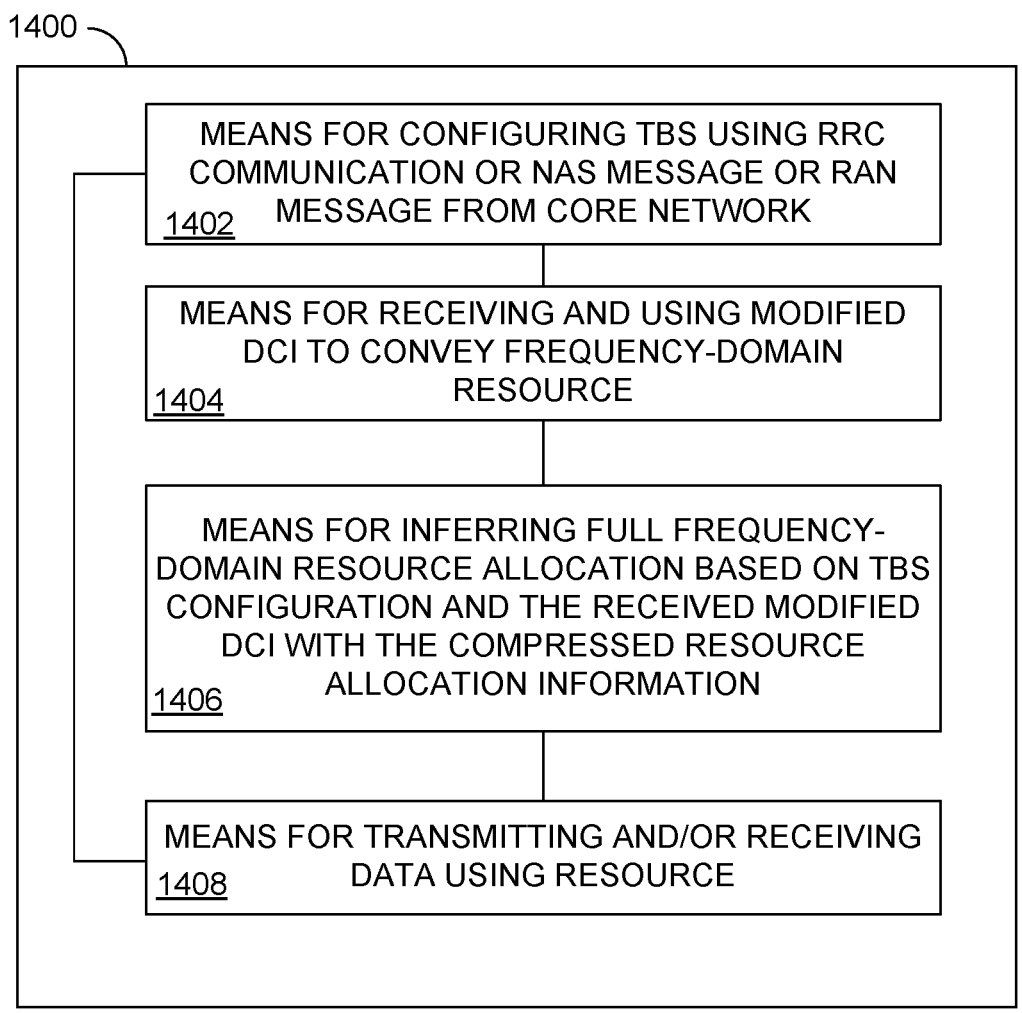
FIG. 14 is a functional block diagram of an apparatus for a communication system in accordance with various aspects of the present disclosure.

FIG. 14 is a functional block diagram of an apparatus 1400 for a communication system in accordance with various aspects of the present disclosure. The apparatus 1400 comprises means 1402 for configuring an S/A device by receiving a TBS configuration using an RRC communication, a NAS message, and/or a RAN message, or another communication, from a controller or from a core network.

In certain embodiments, the means 1402 for configuring an S/A device by receiving a TBS configuration using an RRC communication, a NAS message, and/or a RAN message, or another communication, from a controller or from a core network can be configured to perform one or more of the function described in operation block 1302 of method 1300 (FIG. 13). In an exemplary embodiment, the means 1402 for configuring an S/A device by receiving a TBS configuration using an RRC communication, a NAS message, and/or a RAN message, or another communication, from a controller or from a core network may comprise one or more of the antenna 602, antenna 604, the WiFi/Bluetooth RF front end circuitry 606, the LTE/5G RF front end circuitry 608, and the baseband system 610 of the S/A device 600 receiving an RRC communication, a NAS message, and/or a RAN message, or another communication from a controller 108 or from a core network 116 and configuring the S/A device 114 with the TBS using the RRC connection, the NAS message, and/or the RAN message, or another communication.

The apparatus 1400 further comprises means 1404 for receiving and using a modified DCI communication to convey frequency-domain resource assignment using fewer bits than if the TBS were not pre-configured. In certain embodiments, the means 1404 for receiving and using a modified DCI communication to convey frequency-domain resource assignment using fewer bits than if the TBS were not pre-configured can be configured to perform one or more of the functions described in operation block 1304 of method 1300 (FIG. 13). In an exemplary embodiment, the means 1404 for receiving using a modified DCI communication to convey frequency-domain resource assignment using fewer bits than if the TBS were not pre-configured may comprise one or more of the antenna 602, antenna 604, the WiFi/Bluetooth RF front end circuitry 606, the LTE/5G RF front end circuitry 608, and the baseband system 610 of the S/A device 600 receiving the modified DCI communication with a compressed, or modified, frequency-domain resource allocation information from the controller 108, and using the modified DCI with a compressed, or modified, frequency-domain resource allocation information to convey frequency-domain resource assignment.

The apparatus 1400 further comprises means 1406 for inferring the full frequency-domain resource assignment or allocation based on the pre-configured TBS configuration and the modified DCI having the compressed resource allocation. In certain embodiments, the means 1406 for inferring the full frequency-domain resource assignment or allocation based on the pre-configured TBS configuration and the modified DCI having the compressed resource allocation can be configured to perform one or more of the functions described in operation block 1306 of method 1300 (FIG. 13). In an exemplary embodiment, the means 1406 for inferring the full frequency-domain resource assignment or allocation based on the pre-configured TBS configuration and the modified DCI having the compressed resource allocation may comprise one or more of the antenna 602, antenna 604, the WiFi/Bluetooth RF front end circuitry 606, the LTE/5G RF front end circuitry 608, and the baseband system 610 of the S/A device 600 inferring the full frequency-domain resource assignment or allocation based on the pre-configured TBS configuration and the modified DCI having the compressed resource allocation.

The apparatus 1400 further comprises means 1408 for transmitting and/or receiving data using the identified resource. In certain embodiments, the means 1408 for transmitting and/or receiving data using the identified resource can be configured to perform one or more of the functions described in operation block 1308 of method 1300 (FIG. 13). In an exemplary embodiment, the means 1408 for transmitting and/or receiving data using the identified resource may comprise one or more of the antenna 602, antenna 604, the WiFi/Bluetooth RF front end circuitry 606, the LTE/5G RF front end circuitry 608, and the baseband system 610 of the S/A device 600 transmitting and/or receiving data using the resource identified by the modified DCI.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
   receiving a transport block size (TBS) configuration containing at least a portion of a frequency-domain resource allocation; and
   receiving a downlink control information (DCI) message having an additional portion of the frequency-domain resource allocation, the TBS configuration and the additional portion of the frequency-domain resource allocation having frequency-domain resource allocation information to support data communication, wherein a frequency-domain resource assignment field in the DCI message comprises bits identifying a beginning resource block (RB) location in a communication stream.

2. The method of claim 1, wherein the transport block size (TBS) configuration is communicated using one or more of a radio resource connection (RRC) configuration message, a non-access stratum (NAS) message, a message from the radio access network (RAN) and/or a message from a core network.

3. The method of claim 1, wherein a communication device infers complete frequency-domain resource allocation information from the transport block size (TBS) configuration and the additional portion of the frequency-domain resource allocation to support data communication.

4. The method of claim 1, wherein the DCI message may comprise one or more of a physical downlink shared channel (PDSCH) resource allocation, a physical uplink shared channel (PUSCH) resource allocation, and a combined PDSCH and PUSCH resource allocation.

5. The method of claim 1, wherein when the transport block size (TBS) configuration and the DCI message having an additional portion of a frequency-domain resource allocation are insufficient for communication, receiving a fall back DCI message containing complete frequency resource information.

6. The method of claim 1, wherein the transport block size (TBS) configuration comprises a configuration selected from the group consisting of a fixed-packet size transport block size (TBS) configuration, a TBS+k configuration, a (1+delta)*TBS configuration, and a maximum (max) TBS value.

7. The method of claim 1, further comprising after identifying the beginning resource block location, inferring a total number of resource blocks to support data communication.

8. The method of claim 1, further comprising communicating on resources that include the frequency-domain resource allocation.

9. A system for communication, comprising:
   a communication device configured to receive a transport block size (TBS) configuration containing at least a portion of a frequency-domain resource allocation; and
   the communication device configured to receive a downlink control information (DCI) message having an additional portion of the frequency-domain resource allocation, the TBS configuration and the additional portion of the frequency-domain resource allocation having frequency-domain resource allocation information to support data communication, wherein a frequency-domain resource assignment field in the DCI message comprises bits identifying a beginning resource block (RB) location in a communication stream.

10. The system of claim 9, wherein the transport block size (TBS) configuration is communicated using one or more of a radio resource connection (RRC) configuration message, a non-access stratum (NAS) message, a message from the radio access network (RAN) and/or a message from a core network.

11. The system of claim 9, wherein the communication device infers complete frequency-domain resource information from the transport block size (TBS) configuration and the additional portion of the frequency-domain resource allocation to support data communication.

12. The system of claim 9, wherein the DCI message may comprise one or more of a physical downlink shared channel (PDSCH) resource allocation, a physical uplink shared channel (PUSCH) resource allocation, and a combined PDSCH and PUSCH resource allocation.

13. The system of claim 9, wherein when the transport block size (TBS) configuration and the DCI message having an additional portion of a frequency-domain resource allocation are insufficient for communication, receiving a fall back DCI message containing complete frequency resource information.

14. The system of claim 9, wherein the transport block size (TBS) configuration comprises a configuration selected from the group consisting of a fixed-packet size transport block size (TBS) configuration, a TBS+k configuration, a (1+delta)*TBS configuration, and a maximum (max) TBS value.

15. The system of claim 9, further comprising after identifying the beginning resource block location, inferring a total number of resource blocks to support data communication.

16. The system of claim 9, further comprising the communication device configured to communicate on resources that include the frequency-domain resource allocation.

17. A method for communication, comprising:
receiving a transport block size (TBS) configuration containing at least a portion of a frequency-domain resource allocation;
receiving a downlink control information (DCI) message having an additional portion of the frequency-domain resource allocation, the TBS configuration and the additional portion of the frequency-domain resource allocation having frequency-domain resource allocation information to support data communication wherein a frequency-domain resource assignment field in the DCI message comprises bits identifying a beginning resource block (RB) location in a communication stream; and
after identifying the beginning resource block (RB) location, inferring a total number of resource blocks to support data communication.

18. The method of claim 17, wherein the transport block size (TBS) configuration is communicated using one or more of a radio resource connection (RRC) configuration message, a non-access stratum (NAS) message, a message from the radio access network (RAN) and/or a message from a core network.

19. The method of claim 17, wherein the DCI message may comprise one or more of a physical downlink shared channel (PDSCH) resource allocation, a physical uplink shared channel (PUSCH) resource allocation, and a combined PDSCH and PUSCH resource allocation.

20. The method of claim 17, wherein when the transport block size (TBS) configuration and the DCI message having an additional portion of a frequency-domain resource allocation are insufficient for communication, receiving a fall back DCI message containing complete frequency resource information.

21. The method of claim 17, wherein the transport block size (TBS) configuration comprises a configuration selected from the group consisting of a fixed-packet size transport block size (TBS) configuration, a TBS+k configuration, a (1+delta)*TBS configuration, and a maximum (max) TBS value.

22. The method of claim 17, further comprising communicating on resources that include the frequency-domain resource allocation.

23. A non-transitory computer-readable medium storing computer executable code for communication, the code executable by a processor to:
receive a transport block size (TBS) configuration containing at least a portion of a frequency-domain resource allocation;
receive a downlink control information (DCI) message having an additional portion of the frequency-domain resource allocation, the TBS configuration and the additional portion of the frequency-domain resource allocation having frequency-domain resource allocation information to support data communication, and
use a frequency-domain resource assignment field in the DCI message comprising bits to identify a beginning resource block (RB) location in a communication stream.

24. The non-transitory computer-readable medium of claim 23, the code executable by a processor to:
receive the transport block size (TBS) configuration using one or more of a radio resource connection (RRC) configuration message, a non-access stratum (NAS) message, a message from the radio access network (RAN) and/or a message from a core network.

25. The non-transitory computer-readable medium of claim 23, wherein the code is executable by a processor to:
infer complete frequency-domain resource information from the transport block size (TBS) configuration and the additional portion of the frequency-domain resource allocation to support data communication.

26. The non-transitory computer-readable medium of claim 23, wherein the code is executable by a processor to:
receive the DCI message in one or more of a physical downlink shared channel (PDSCH) resource allocation, a physical uplink shared channel (PUSCH) resource allocation, and a combined PDSCH and PUSCH resource allocation.

27. The non-transitory computer-readable medium of claim 23, wherein the code is executable by a processor to:
when the transport block size (TBS) configuration and the DCI message having an additional portion of a frequency-domain resource allocation are insufficient for communication, receiving a fall back DCI message containing complete frequency resource information.

28. The non-transitory computer-readable medium of claim 23, wherein the code is executable by a processor to:
configure the transport block size (TBS) configuration to comprise a configuration selected from the group consisting of a fixed-packet size transport block size (TBS) configuration, a TBS+k configuration, a (1+delta)*TBS configuration, and a maximum (max) TBS value.

29. The non-transitory computer-readable medium of claim 23, wherein the code is executable by a processor to:
after identifying the beginning resource block location, infer a total number of resource blocks to support data communication.

30. The non-transitory computer-readable medium of claim 23, wherein the code is executable by a processor to communicate on resources that include the frequency-domain resource allocation.

* * * * *